April 3, 1951      D. W. BARKLEY      2,547,071

MOUNTING FOR REARVIEW MIRRORS

Filed Sept. 30, 1948      3 Sheets-Sheet 1

INVENTOR.
Dwight W. Barkley
BY
Nobbe & Swope
ATTORNEYS

April 3, 1951 D. W. BARKLEY 2,547,071
MOUNTING FOR REARVIEW MIRRORS
Filed Sept. 30, 1948 3 Sheets-Sheet 2
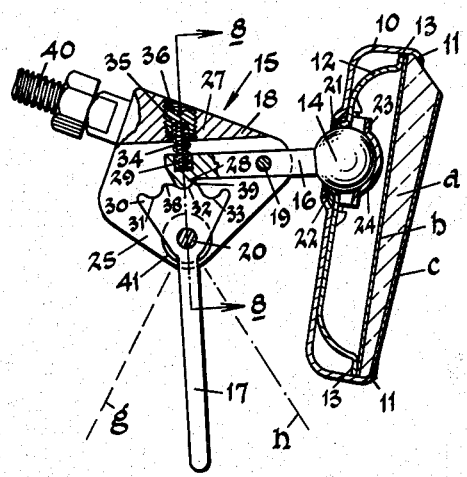
Fig. 7
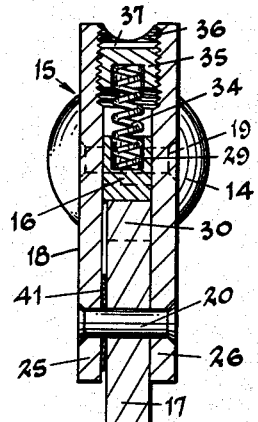
Fig. 8
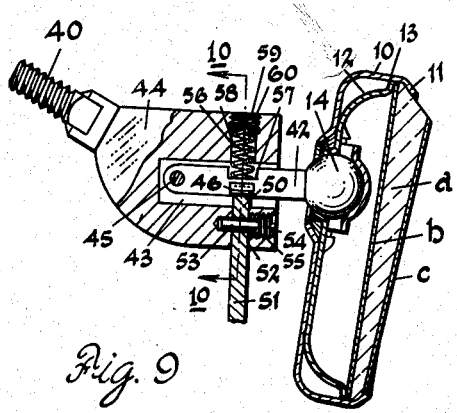
Fig. 9
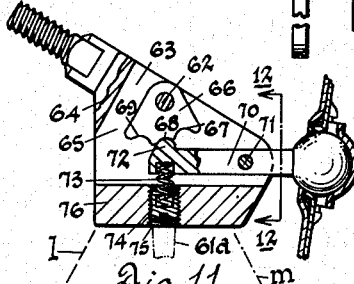
Fig. 12
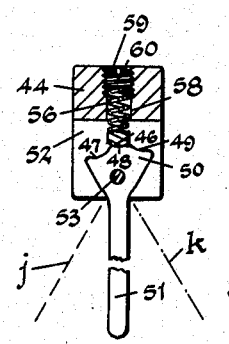
Fig. 10
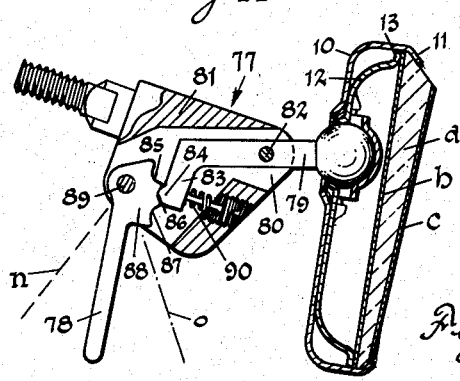
Fig. 11
Fig. 13
INVENTOR.
Dwight W. Barkley
BY
Nobbe & Swope
ATTORNEYS April 3, 1951 D. W. BARKLEY 2,547,071
MOUNTING FOR REARVIEW MIRRORS
Filed Sept. 30, 1948 3 Sheets-Sheet 3

INVENTOR.
Dwight W. Barkley
BY
Nobbe & Swope
ATTORNEYS

Patented Apr. 3, 1951

2,547,071

UNITED STATES PATENT OFFICE 2,547,071

MOUNTING FOR REARVIEW MIRRORS

Dwight W. Barkley, Cheswick, Pa., assignor to Libbey-Owens-Ford Glass Company, Toledo, Ohio, a corporation of Ohio Application September 30, 1948, Serial No. 52,094

15 Claims. (Cl. 248—205)

My invention relates to improvements in rear view mirrors which are used in automobiles and more particularly to the mounting thereof.

The primary purpose in the use of a rear view automobile mirror is of course to provide the driver with a satisfactory view of the rear road under the various conditions of driving. Heretofore, rear view mirrors have had to be designed with reflectivities which gave a reasonably acceptable compromise for most drivers between glare elimination and visibility. Thus, lead sulfide mirrors, having a reflectivity of about 30% and which represent by far the greatest number of rear view mirrors in use today, are objected to by many drivers as producing intolerable glare in night driving, while many others consider their reflectivity as too low for day driving.

For day driving a reflectivity of over 30%, preferably in the range of 40% to 60%, is quite useful. For night driving, however, lower reflectivities are necessary to prevent glare. A mirror of reflectivity between approximately 10% and 30%, preferably between 18% and 22%, has been found to provide ideal glare removal while providing excellent rear road visibility for most drivers. The provision of a mirror for night driving with a single fixed reflectivity in this range, as in prior used rear view automobile mirrors, has represented a compromise which has been unsuitable for many drivers due to the great variation in the ability of human eyes to withstand glare and in the ability to see at various light intensities. It has also been unsuitable for preventing glare from extremely high light intensity conditions.

A mirror providing a choice of two reflections of approximately 75% for day driving and approximately 4.25% for night driving has been liked by many drivers for the increased daytime reflectivity except in sun and snow glare conditions. However, it has been generally found that the approximately 4.25% reflectivity available for night driving while removing glare has been of little use since seeing ability was simultaneously removed.

In my copending application filed November 26, 1947, Serial No. 788,120, I have disclosed and claimed an improved type of prismatic rear view mirror device which provides the automobile driver with a personal selection of three or more intensities of images of the rear road conditions. Such a mirror permits the driver to make a choice of the images of various brightness, each image being of the common limited rear field of view so as to obtain maximum visibility with the minimum glare best suited to his particular personal eye glare tolerance and visual acuity under all the varying light intensities present under modern night and day driving conditions.

The mirror device, which is the subject of my copending application, provides for abnormal driving conditions and for the wide variations in eye sensation of automobile drivers by providing at least three images of the rear road conditions which the driver may select as the rear lighting conditions and his eye sensitivity to glare and visibility vary. The choice of image intensity suitable to the driver is made by his selectively positioning the prismatic rear view mirror by angular adjustment to alternately locate the various images of differing intensities of the same limited common field of rear view in the normal line of sight of the driver as he sits in driving position in the car. Thus, the rear view mirror may provide a choice of at least three image intensities which may be, for example, of over 30%, between 10% and 30% approximately, and of over 4.5% up to 12% approximately of the incident light falling upon the rear view mirror and coming from the rear view of the road, etc.

This invention is primarily concerned with the mounting of the improved mirror of my copending application and has for its primary object the provision of a special mounting by which the mirror may be angularly adjusted to predetermined positions to selectively locate any one of three different image intensities of the same limited common field of view in the normal line of sight of the driver.

Another object of this invention is the provision of such a mounting for a rear view mirror embodying simple yet effective means by which the driver may angularly adjust the mirror to predetermined positions at will to selectively locate in the predetermined position of the driver's eyes the first, second and third images of the common rear field view.

Another object of the invention is the provision of such a mounting so constructed that the rear view mirror can be readily and conveniently tilted upwardly or downwardly by the driver within a controlled arc to bring any one of the three images of various intensities into the line of vision of the driver and including means for insuring maintenance of the mirror in selected position.

A further object of the invention is the provision of a mounting for a rear view mirror embodying means enabling tilting movement of the mirror to any one of three positions by finger tip control to give the desired intensity of image and for effectively locking the mirror in selected position.

A still further object of the invention is the provision of cooperating spring and cam means for effectively preventing accidental displacement of the mirror after it has been moved to predetermined adjusted position while permitting it to be easily and quickly shifted to another position by the driver with a minimum of effort and attention and without disturbing the initial adjustment of the mirror in relation to the driver.

Other objects and advantages of the invention will become more apparent during the course of the following description, when taken in connection with the accompanying drawings.

In the drawings, wherein like numerals are employed to designate like parts throughout the same:

Fig. 7 is a vertical transverse sectional view of the mirror and mirror mounting;

Fig. 8 is a sectional view taken substantially on line 8—8 of Fig. 7;

Fig. 9 is a sectional view similar to Fig. 7 but showing a modified arrangement of parts in which the mirror actuating lever is manipulated in lateral directions;

Fig. 10 is a sectional view taken substantially on line 10—10 of Fig. 9;

Fig. 11 is a sectional view of another modified form of mirror mounting;

Fig. 12 is a sectional view taken substantially on line 12—12 of Fig. 11;

Fig. 13 is a sectional view showing a further modification of the operating elements of the mirror mounting;

As explained in detail in my above-noted copending application, the mirror comprises at least two mirror reflecting surfaces or reflective means associated with each other and arranged, one behind the other, with either their lower or upper edges in converging relationship and with the other edges more widely spaced apart. Thus, the mirror reflective means or coatings deposited upon front and rear supporting surfaces are arranged in a non-parallel relationship to provide a prism or a support of prism form. As a suitable support for the mirror reflective means or coatings, I may employ transparent bodies such as glass or plastic prisms or sheets of the same arranged in prism forms, the sheets being held in close and fixed or fastened angular relationship by a frame.

The angle between the two mirror reflective means or coatings, which form a front and a rear mirror disposed at such angle to each other, is preferably of the order of three and one-fourth degrees, although there may readily be used an angular separation between the two mirrors of from two to ten degrees or more. The smaller angular separations are preferable where solid prism supports are employed and the larger angular separations of close to ten degrees are preferable and give somewhat more convenient operation when a prism form composed of glass sheets is used.

Figure 1:
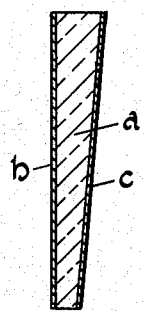
Fig. 1 is a vertical sectional view through a mirror made from a wedge shaped piece of glass.

By way of example, the mirror in Fig. 1 consists of a support of glass or other transparent material $a$ which is wedge shaped in vertical cross section. The back surface of the support $a$ carries a highly reflective mirror film means $b$ which, as a coating on a plane sheet of glass, would have a reflectivity preferably ranging from 50% to 95% or more. The front surface of this support carries a mirror reflective film means $c$.

The front reflective film means $c$ is semi-transparent and of preferably substantially no light absorption. It may be of a reflectivity of 10% to 30% and in such cases might be used in normal night driving and in daytime driving under snow and sun glare conditions. Or, the front reflective film means may be of higher reflectivity of up to an approximate maximum of 70%, in which case this front mirror of 30% to 70% substantially will be employed largely as a day driving mirror. The rear reflective film means $b$ is preferably opaque, although it may also be semi-transparent, but if so preferably of less transparency than film means $c$. If the film means $b$ is transparent, it may or may not be backed with an opaque coating.

According to this invention, the mirror of Fig. 1 is carried by a substantially rectangular housing or case 10 open at the front and in which opening the mirror is arranged and held against forward displacement by the peripheral flange 11 of said case which is bent over the edges of the mirror as best shown in Fig. 7. To hold the mirror against rearward displacement, there is arranged within the case 10 a backing plate 12, the flanged peripheral edge 13 of which engages the back of the mirror. If desired, a protective sheet or layer of paper or other suitable material can be interposed between the back of the mirror and the flange 13.

Figure 2:
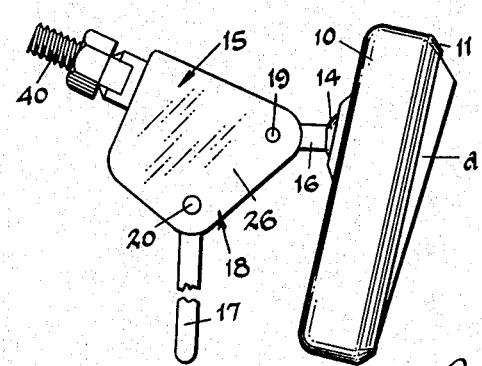
Fig. 2 is a side elevation of the mirror and the mirror mounting means provided by this invention.

To provide for mounting the mirror in a vehicle so that it may be adjusted to properly position the reflecting surfaces $b$ and $c$ for different drivers, the case 10 is carried on the truncated ball 14 of the special tiltable mounting designated in its entirety by the numeral 15. As illustrated in Figs. 2, 7 and 8, the mounting comprises generally a horizontal mirror supporting arm 16 connected to or integral with and extending rearwardly from the ball 14 and a depending mirror operating element or lever 17, said arm 16 and lever 17 being pivotally carried in a relatively narrow block or body member 18 upon pivot pins 19 and 20 respectively. Upon swinging of the lever 17 about its pivot 20, the arm 16 will be rocked upon pin 19 to effect a step by step angular adjustment of the mirror either upwardly or downwardly when the mirror is supported as shown in Fig. 3 in a suitable position in the automobile, as will be more fully hereinafter described.

Figure 3:
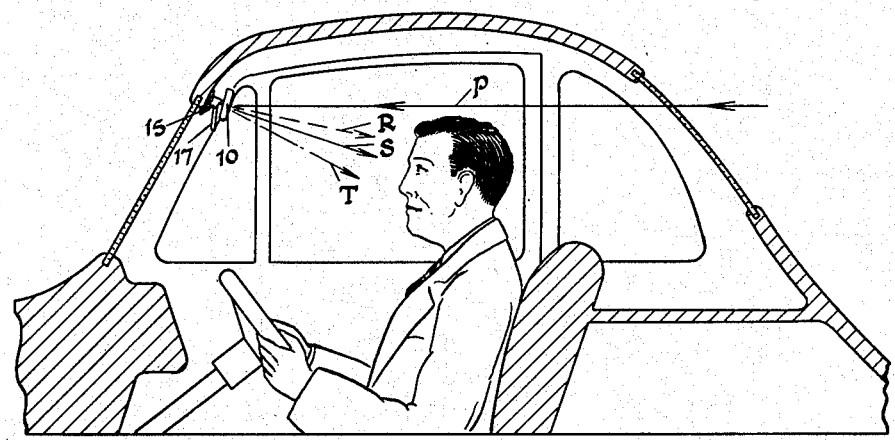
Fig. 3 is a diagrammatic view showing how the mirror is used in an automobile.

This stepwise angular adjustment functions to permit the driver to selectively focus alternately to his eyes the images of different light intensities of the limited common field view as indicated by the various rays in Fig. 3, namely, R, S and T, where the image is incident as light upon the mirror as shown by line $p$. By properly tilting the mirror, the lines R, S and T may be selectively brought to the level of the driver's eyes so that he will see the image from the front mirror reflective film means $c$ or the image from the rear reflective film means $b$ as modified by the light transmission of the front mirror reflective means, or a multiple reflected image arising from internal reflections within the prism form.

Figure 4:
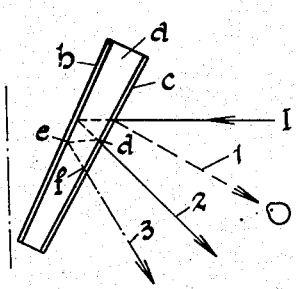
Fig. 4 is a diagrammatic view of the mirror showing how it provides a reflected image from the front mirror surface visible to the driver at the point shown.
Figure 5:
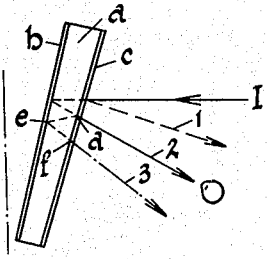
Fig. 5 is a similar view showing how a reflected image visible to the driver is formed by reflection of light from the rear mirror surface.
Figure 6:
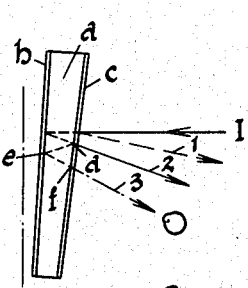
Fig. 6 is a further similar view showing how a third reflected image is formed by reflection from the rear mirror surface by internal reflection within the prism formed by cooperating reflection from the front mirror surface.

As shown in Figs. 4, 5 and 6, the light incident upon the mirror device, originating from the object I, is reflected as the several image beams 1, 2 and 3. In each of the figures, beam 1 is a reflection directly from the front mirror means $c$. This is shown as reflected to the driver's eyes in Fig. 4, but in Figs. 5 and 6 it is reflected above the driver's eyes and is not visible to him. The beams 2 and 3 in Fig. 4 are reflected below the driver's eyes so that he sees the reflected beam 1 only.

In Fig. 5 the reflected beam 2 alone reaches the driver's eyes, and in Fig. 6 the mirror device has been shifted angularly further to bring reflected beam 3 into the driver's eyes. In Fig. 5 this same beam 3 is below the normal line of sight of the driver. The selective shifting indicated in Fig. 6 brings beam 3 only into the driver's eyes, and brings the other reflected beams 1 and 2 above the normal line of sight of the driver. The vertical line appearing in each of Figs. 4, 5 and 6 serves to indicate a relative degree of angular shifting of the prism form in those figures.

It will be noted in Figs. 4, 5 and 6 that the reflected beam 1 originates by reflection from the front mirror means $c$, while the reflected beam 2 results from the first reflection from the rear mirror means $b$. Such latter beam, however, passes through the front mirror means $c$ twice and is modified by the light transmission of such front mirror means. The incident light is decreased in intensity by the light reflection properties of the front mirror means $c$ and the absorption of light by such reflective means $c$. Thus, the incident light is reduced by the reflection of beam 1 so that not all the incident light reaches the rear reflective means $b$. The reflection ability of the rear reflective means $b$ then determines the amount of light returned forwardly, but before the reflected beam issues from the prism form a further reflection occurs at point $d$ by the front mirror means. Thus, the beam 2 is of a reduced intensity as compared to the incident beam.

The origin of beam 3 will be seen to be by internal reflection within the prism form by the cooperative action of the front mirror means and of the rear mirror reflective means. Thus, the incident beam after reduction in intensity by light reflected as ray 1 by the front mirror means $c$ passes to the rear mirror reflective means and is reflected back therefrom. As just explained above, this reflected ray passes out of the mirror as beam 2 but in doing so is subject to partial reflection at point $d$ by the front mirror means. Thus, the incident light is further reduced by the loss of ray 2 before the internally reflected light arrives back at the rear mirror reflective means again and is reflected again at point $e$. Such reflection again exerts a reduction in intensity, and a further reduction in light intensity of the beam 3 occurs as some light is again reflected at point $f$ as the beam passes through the front mirror means.

More particularly, the ball 14, carried by mirror supporting arm 16, extends through an opening 21 in the case 10 and is mounted on a spherical seat or bearing 22 formed in the backing plate 12 in alignment with opening 21. The ball is held in the seat by a strap 23 having a central bearing portion 24 conforming to and engaging the ball 14. The metal strap is suitably fastened at its opposite ends to the backing plate 12 in a manner well known in the art. Normal positioning of the mirror may be obtained by swivel movement thereof about the truncated ball 14; however, the surface pressure created by the metal strap 23 in retaining said ball on the spherical seat 22 is sufficient to maintain the mirror in its initially adjusted position with relation to the driver.

Extending rearwardly from the flattened end of the truncated ball 14, the mirror supporting arm 16 is received between the side walls 25 and 26 of the body member 15 and is pivoted intermediate its end upon the pivot pin 19. The side walls of the body member are connected together along their upper edges by a web 27. The arm 16 is provided at its inner end with a spherical boss or the like 28 extended from its lower surface, while formed in its upper surface opposite boss 28 is a well or recess 29. The boss 28 is engageable by the enlarged upper end 30 of actuating lever 17, which constitutes a cam having formed in its upper edge the three grooves 31, 32 and 33 disposed radially at different distances from the axis about which the lever swings as defined by the pivot pin 20.

The boss 28 on arm 16 is yieldably urged at all times into engagement with the upper edge of cam 30 by a spring 34 located in the well 29 in arm 16 and backed by a socket screw 35 threaded within a hole 36 formed in the web 27. Preferably, the screw 35 is provided with the usual slot 37 so that it can be easily turned within the hole 36 to vary the pressure of the spring 34 on arm 16.

The grooves 31, 32 and 33 are so located in angular relation to each other that an equal movement of the lever 17 in either direction to displace the groove 32 from boss 28 will position groove 31 or 33 in engagement therewith. The grooves comprise a gradually descending cam surface from groove 31 to groove 33 and are so formed in the enlarged end 30 of lever 17 that, upon swinging of said lever, they produce rocking movements of the arm 16 to locate the mirror in either its extreme upper or lower position or in an intermediate position to obtain the desired image intensity.

When it is desired to tilt the mirror downwardly to its extreme lowered position indicated in Fig. 4, the lever 17 is thrust away from the driver to the position indicated by the line $g$ in Fig. 7, whereupon the image beam 1 will be reflected to the driver's eyes. As the boss 28 enters and is seated in groove 31, it will have elevated the inner end of arm 16 with a consequent lowering of the outer end thereof on which the mirror is carried.

When the mirror is to be tilted upwardly to its extreme upper position, the lever 17 is moved in the opposite direction or toward the driver to the position indicated by the line *h* in Fig. 7, whereupon the boss 28 will seat in the groove 33, and by reason of the difference in radial distances of the grooves 31 and 33 from pivot pin 20, the inner end of arm 16 will descend while the outer end thereof will rise, with a resultant tilting upwardly of the mirror to the position indicated in Fig. 6, at which time the image beam 3 will be reflected to the driver's eyes.

Between its extreme upper and lower positions the mirror is adapted to assume an intermediate position as shown in full lines in Fig. 7, in which position the image beam 2 will be reflected to the driver's eyes as shown in Fig. 5. When in such position, the mirror will be held in place by means of the boss 28 seating in groove 32, the radial distance of groove 32 from pivot pin 20 being substantially midway those of grooves 31 and 33.

The rocking movements of the arm 16, caused by swinging of the lever 17, are resisted by the spring 34. This influence of the spring is particularly pronounced during swinging of the lever 17 to place any one of the grooves 31, 32 and 33 in engagement with the boss 28. Nevertheless, relatively little pressure is required to tilt the mirror against the action of the spring-pressed arm 16. As soon as either the ridge 38 between grooves 31 and 32, or the corresponding ridge 39 between grooves 32 and 33, has passed the axial line extending through pivot pin 20 and spring 34, said spring will actually assist the tilting movement and literally snap the boss 28 into place. It is only necessary that the driver swing the lever 17 back or forth and the mounting will automatically function to limit the movement of the mirror when it reaches the desired selected position and insure its maintenance in such position until again changed by the driver.

The body member 18 is provided with a threaded shank 40 by which the mounting may be fixedly secured in position in the automobile, although other types of securing means may of course be provided. In order to prevent any undesirable play or vibration between the lever 17 and body member 18, there may be provided a spring washer 41 carried on pivot pin 20 and interposed between said lever and one wall of said body member.

The tilting of the mirror as above described to obtain the desired image intensity may also be effected by the modified arrangement of mirror supporting arm and mirror actuating lever illustrated in Figs. 9 and 10, wherein the lever is so mounted that it is responsive to lateral swinging movements. More particularly, the arm 42 is received within a recess 43 in the body member 44 and is pivotally mounted at its inner end upon a transverse pivot pin 45. The arm 42 is provided in its lower surface and intermediate its ends with an arcuately faced notch 46 selectively engageable in the three grooves 47, 48 and 49 formed in the enlarged upper end 50 of the actuating lever 51.

The lever 51 is inserted upwardly through a slot 52 in the body member 44 and the upper end thereof projects into the recess 43 in said body member where it engages arm 42. The lever is mounted upon a pivot pin 53 which extends at right angles to the pivot pin 45 for the arm 42 so that the lever swings laterally relative to said arm. The pivot pin 53 is formed at the inner end of a screw 54 threaded in a hole 55 in the body member.

The grooves 47, 48 and 49 in the upper end of lever 51 are so arranged as to produce tilting of the mirror from its extreme lower position (Fig. 4) through its intermediate position (Fig. 5) to its extreme upper position (Fig. 6), thereby obtaining the desired image intensities according to the direction in which the lever is swung. Thus, movement of the lever to the position indicated by the line *j* in Fig. 10 will locate the groove 47 in the notch 46 of arm 42 and, since the radial distance of the groove 47 from the pivot pin 53 is less than the radial distance of the intermediate groove 48, the arm 42 will be disposed so as to tilt the mirror to its extreme lower position as shown in Fig. 4 whereby the image beam 1 will be reflected to the driver's eyes.

Since the radial distance of the groove 49 from pivot pin 53 is greater than the distance of the groove 48, swinging of the lever to the position indicated by line *k* in Fig. 10 will tilt the mirror to its extreme upper position at which time the image beam 3 will be reflected to the driver's eyes as shown in Fig. 6.

Between its extreme upper and lower positions, the mirror is adapted to assume an intermediate position as shown by the location of the lever 51 in full line in Fig. 10, in which position the image beam 2 will be reflected to the driver's eyes as shown in Fig. 5. When in such position, the mirror will be held in place by the arcuately surfaced notch 46 of the arm engaging in groove 48 of the lever.

During tilting of the mirror to predetermined selected position, the arm is held in engagement with the grooved end of the lever by a spring 56 so as to snap into engagement with the respective groove 47 or 49 when the lever reaches the extremities of its swing in either direction and also to snap into the groove 48 as the lever passes midway between said extremities of movement. The spring 56 is received in a square notch 57 provided in the arm opposite the arcuate notch 46 and is carried in a hole 58 in the body member which is partially tapped as at 59 for the threaded plug 60. By proper adjustment of the plug 60, the pressure of said spring against the arm can be varied as desired.

In the two types of mountings described above, the actuating levers 17 and 51 are pivoted within the body member, but an external lever arrangement may be employed as in Figs. 11 and 12, if desired, without departing from the spirit of the invention. As shown therein, the actuating lever 61 is keyed to the outer end of a horizontal shaft 62 which is journalled in the side walls 63 of the body member 64. Fixed to the shaft 62 and received in the recess 65 between the side walls of the body member is a depending cam 66. Formed in the lower edge of said cam are the three grooves 67, 68 and 69 rising from groove 67 to groove 69 to effect tilting of the mirror, upon swinging of lever 61, to either its extreme upper or lower positions or to an intermediate position as described above to obtain the selected image intensity.

The mirror supporting arm 70 is pivoted intermediate its ends in the recess 65 in the body member upon a horizontal transverse pin 71 and is provided at its inner end with a boss 72 adapted to be received within the grooves of the cam 66. The inner end of arm 70 is yieldably maintained in engagement with cam 66 by a spring 73, said spring being carried by a screw plug 74 threaded into a tapped hole 75 extending through the web 76 connecting the side walls of the body member. The pressure of the spring upon the arm may be varied by proper adjustment of the plug 74.

With this arrangement, the mirror can also be easily tilted to obtain the desired image intensity by swinging the lever 61 in the required direction. Thus, when the driver desires to receive the image beam 1 as in Fig. 4, the lever 61 is swung from the phantom position 61a to the broken line l in Fig. 11 at which time the groove 67 of cam 66 will be moved to receive the boss 72 on arm 70 to allow upward movement of the inner end of the arm and consequent downward movement of said mirror.

Conversely, when the lever 61 is swung to a position indicated by the broken line m, the groove 69 of the cam will be moved to receive the boss 72 of arm 70 thereby forcing the inner end of said arm downwardly against the spring 73 at which time the outer end of the arm will rise to effect tilting of the mirror so that the image beam 3 will be reflected to the driver's eyes as in Fig. 6.

In the intermediate position assumed by the mirror, between its extreme upper and lower positions, the boss 72 on arm 70 is received in the groove 68 as shown in full lines in Fig. 11, in which position the image beam 2 will be reflected to the driver's eyes as in Fig. 5.

In Fig. 13 is illustrated a further modified form of mirror mounting indicated in its entirely by the numeral 77, and in which the actuating lever 78 is disposed rearwardly of the supporting arm 79. As herein shown, the arm 79 is received in an opening 80 extending through the body member 81 and is mounted therein adjacent its forward end upon a transverse pin 82. The arm 79 is provided at its inner end with a turned down portion 83 formed with a boss 84 which is adapted for selective engagement with the forwardly directed grooves 85, 86 and 87 formed in the cam 88 at the upper end of lever 78.

The cam 88 is also received in the opening 80 in the body member and is pivoted upon a pin 89. The boss 84 on the down turned end 83 of arm 79 is maintained in engagement with the cam by a spring 90 carried by the body member. The grooves 85, 86 and 87 are arranged in a progressive sequence of elevation with respect to each other, as described above, so that as the lever 78 is swung to the position n, the groove 85 will be moved to receive the boss 84 and cause rocking of the arm to tilt the mirror to the position in Fig. 4, while movement of the lever in the opposite direction to position o will bring the groove 87 in position to receive the boss to tilt the mirror to the position in Fig 6. When the lever is in the position shown in full lines in Fig. 13, the boss will be received in notch 86 and the mirror maintained in the position shown in Fig. 5.

Figure 14:
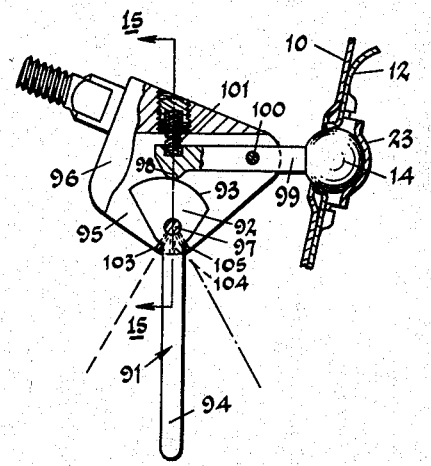
Fig. 14 is a sectional view of a mounting similar to that shown in Fig. 7 but in which a different type of mirror actuating lever is employed.
Figure 16:
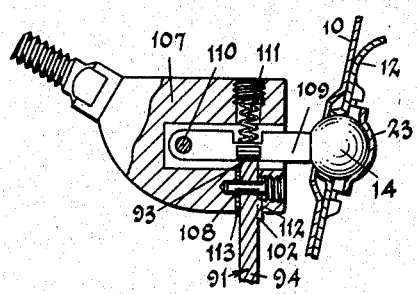
Fig. 16 is a sectional view of a mounting similar to that shown in Fig. 9 but embodying a different type of mirror actuating lever.
Figure 17:
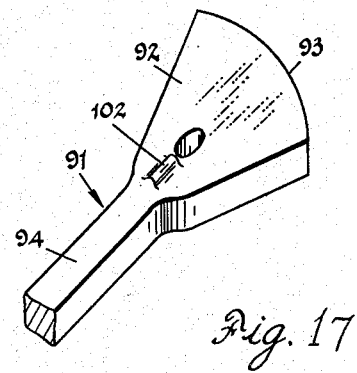
Fig. 17 is a perspective view of the actuating lever employed in the structures illustrated in Figs. 14 to 16 inclusive.

The modifications shown in Figs. 14 and 16 are substantially the same as shown in Figs. 7 and 9 respectively, the essential difference being that in Figs. 14 and 16, a smooth surfaced cam element is employed in place of the grooved cam element in Figs. 7 and 9. As illustrated in Fig. 17, the lever 91 is provided at one end with a head 92 having a cam surface 93 and at its opposite end with a handle portion 94.

Figure 15:
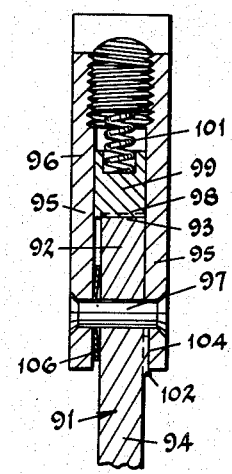
Fig. 15 is a sectional view taken substantially on line 15—15 of Fig. 14.

In Figs. 14 and 15, the lever 91 is pivoted between the side walls 95 of the body member 96 upon a pin 97 with the cam surface 93 thereof in engagement with the boss 98 on supporting arm 99. The arm 99 is pivoted as at 100 in the body member and has its inner end yieldably maintained in engagement with the cam surface 93 by a spring 101.

The cam surface 93 is so shaped as to effect the desired tilting of the mirror to any one of its three positions upon swinging of the lever 91 in the same manner as the grooved levers described above. In order to locate the lever in desired adjusted position and to maintain it in such position, it is provided with a detent 102 which is engageable in radial notches 103 and 105 in the body member upon swinging of the lever to tilt the mirror respectively to its extreme lower position or extreme upper position.

Between its extreme upper and lower positions, the mirror is adapted to assume an intermediate position when the detent is located in the notch 104. The notches 103, 104 and 105 are formed in one wall of the body member and positive entry of the detent therein is effected by a spring washer 106 which is interposed between the opposite wall of said body member and the actuating lever.

In Fig. 16, the lever 91 is also used and is pivoted in the body member 107 upon a pin 108. The smooth cam surface 93 at the upper end thereof engages the supporting arm 109 pivoted at 110 and urged into engagement with the cam surface by a spring 111. As in Fig. 9, the lever 91 swings laterally with respect to the supporting arm to effect the desired tilting of the mirror as above described. The lever is relatively thinner than the slot 112 in the body member through which it is inserted to provide for a spring washer 113 for urging the detent 102 into suitable notches provided in the body member upon swinging of the lever as in Fig. 14.

While the mounting thus provides for adjustment of the mirror to give three different light intensities of images of the rear road and traffic conditions, it will be evident that this mounting may be used for supporting and adjusting a two position mirror such as shown in the patent to W. H. Colbert, No. 2,397,947, dated April 9, 1946.

In use, the mirror is first adjusted upon the supporting ball 14 to the proper angular position for the driver of the automobile, after which the mirror is tilted upon the horizontal axis defined by the pivot pin for the mirror supporting arm to selectively bring any one of the light beams 1, 2 or 3 to the driver's eyes. The tilting of the mirror can be easily and quickly effected by movement of the actuating lever in the proper direction with the exercise of little or no care or attention on the part of the driver. Likewise, the tilting of the mirror will in no way affect the adjustment of the mirror on the ball 14 to suit the particular driver.

As more fully disclosed in my copending application, the back mirror reflective means or coating b may be of any material having a high specular reflectivity of 50% to 95% or more. Thus, silver and aluminum of 90% reflectivity are found to be excellent for this purpose. By coating aluminum with a quarter wave length thickness coating of a low index material such as magnesium fluoride and a further quarter wave length thickness of a high index material such as zinc sulfide or titanium dioxide, a multiple coating showing 95% or greater reflectivity may be secured and such a multiple coating may be used as a rear reflective means with advantage as higher reflectivity in the rear reflective means increases generally the brightness of the second, third, and further image. I may also use magnesium, having a reflectivity of 73%; platinum having a reflectivity of 63%; iron having a reflectivity of 55%; chromium having a reflectivity of 55%; nickel having a reflectivity of 60%; and rhodium having a reflectivity of 75%. I may use other materials such as cobalt, iridium, indium, antimony, molybdenum, palladium, cadmium, and other silvery appearing metals.

I may also use for my back reflective means or mirror coating $b$ colored reflectors, such as gold of 60% to 80% reflectivity, or copper of 55% to 75% reflectivity. I may secure such variations in reflectivity value with these or the other metals already given by varying the thickness of such metallic film. I may choose to use a thin film of partially transparent gold backed by an opaque silver mirror. Further, I may also use semi-transparent reflective layers as the mirror film $b$, which are colored by light interference effects as disclosed in the copending applications of William H. Colbert and Willard L. Morgan, Serial No. 646,875, filed February 11, 1946, now Patent No. 2,519,545, and Serial No. 646,876, filed February 11, 1946, now Patent No. 2,519,546; and as disclosed in U. S. Patents No. 2,394,533 and No. 2,430,452.

The use of a colored reflective rear surface reflective mirror means or coating $b$ does not of course give any coloration to the front mirror reflection, but does control the color of the reflecting mirror means $b$. The color of the mirror image reflections coming from within the prism form and the general reflectivity intensity of such reflections may also be colored and affected by the use of a colored prism or of colored glass plates. Also, if the front surface mirror film $c$ is colored by selective reflection or by interference effects, not only is the reflection from this surface colored but a color is imparted to the mirror reflection from film $b$, also by reason of the selective colored light transmission of this semi-transparent coating $e$. Thus, my mirror may not only give colored reflections but the several reflections in the different positions of use do not of necessity appear of similar color but are frequently of different colors as well as of different reflectivities.

As suitable materials for the reflective coatings employed in forming the front reflective means, I may use, by way of example, a semi-transparent, substantially non-light absorptive reflecting coating or coating means of or including as a layer a metallic oxide such as titanium dioxide, antimony tetraoxide or pentoxide, chromium sesquioxide, zirconium dioxide, tungsten trioxide, aluminum sesquioxide, beryllium oxide, stannic oxide, or magnesium aluminate or spinel. There may also be used zirconium silicate or zircon. Such materials may be employed directly as single or as multiple coatings as is necessary to provide sufficient reflectivity as hereafter shown. The reflective properties of such coatings vary with the thickness of such coatings and also vary further as light interference effects occur as the thickness is varied. In multiple coatings which operate to give high reflectivity, I may also use low refractive index materials in combination with layers of other higher index materials, such suitable low index materials being magnesium fluoride, magnesium aluminum fluoride or cryolite, calcium fluoride, lithium fluoride, or silicon dioxide.

Preferably, these reflective coatings for the front reflective means are formed by thermal evaporation within a vacuum, although other methods of deposition may be used, and preferably they are subjected to a heat treatment and oxidation as described in a patent application of Arthur R. Weinrich, Serial No. 783,841, filed November 3, 1947, in which the thermally evaporated coatings are heated in an oxygen containing atmosphere to reduce the light absorption of the thermally evaporated coating to a minimum. Coatings of the above metallic oxide materials may thus be prepared of less than 2% light absorption and generally of less than 1%. By thermal evaporation alone, coatings of less than 5% light absorption may be prepared in certain cases.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In a mounting for a rear view mirror for automobiles, a body member having means for attachment to the automobile, a substantially horizontal supporting arm having means for attachment to the mirror, means for pivotally mounting said arm to said body member, an operating element also pivoted to said body member and including a cam portion at its upper end engaging said arm and a depending handle portion for swinging said operating element about its pivot to cause the cam portion to rock said arm about its pivot to tilt the mirror upwardly or downwardly.

2. In a mounting for a rear view mirror for automobiles, a body member having means for attachment to the automobile, a substantially horizontal supporting arm having means for attachment to the mirror, means for pivotally mounting said arm to said body member, an operating element also pivoted to said body member and including a cam portion at its upper end engaging said arm and a depending handle portion for swinging said operating element about its pivot to cause the cam portion to rock said arm about its pivot to tilt the mirror upwardly or downwardly, and spring means disposed between the body member and supporting arm for yieldably maintaining said supporting arm and cam portion in engagement with one another.

3. In a mounting for a rear view mirror for automobiles, a body member having means for attachment to the automobile and provided with an opening therein, a substantially horizontal supporting arm having its inner end received within said opening and means at its outer end for attachment to the mirror, means for pivotally mounting said arm to said body member within said opening, an operating element also pivoted in said body member and including a cam at its upper end engaging said arm and a depending handle portion projecting exteriorly of the body member for swinging said operating element about its pivot to cause the cam to rock said arm to tilt the mirror upwardly or downwardly.

4. In a mounting for a rear view mirror for automobiles, a body member having means for attachment to the automobile and provided with an opening therein, a substantially horizontal supporting arm having its inner end received within said opening and means at its outer end for attachment to the mirror, means for pivotally mounting said arm to said body member within said opening, an operating element also pivoted in said body member and including a cam at its upper end engaging said arm and a depending handle portion projecting exteriorly of the body member for swinging said operating element about its pivot to cause the cam to rock said arm to tilt the mirror upwardly or downwardly, and spring means carried by said body member and engaging the supporting arm for yieldably maintaining said supporting arm and cam in engagement with one another.

5. In a mounting for a rear view mirror for automobiles, a body member having means for attachment to the automobile and provided with an opening therein, a substantially horizontal supporting arm having means at its outer end for attachment to the mirror and its inner end received within said opening, means for pivotally mounting the arm intermediate its ends within said opening, an operating element having a cam portion received within said opening and a handle portion projecting outwardly thereof, means for pivotally mounting the operating element within said opening, the inner edge of said cam engaging the inner end of the supporting arm for rocking it about its pivot upon swinging of said operating element to tilt the mirror upwardly or downwardly.

6. In a mounting for a rear view mirror for automobiles, a body member having means for attachment to the automobile and provided with an opening therein, a substantially horizontal supporting arm having means at its outer end for attachment to the mirror and its inner end received within said opening, means for pivotally mounting the arm intermediate its ends within said opening, an operating element having a cam portion received within said opening and a handle portion projecting outwardly thereof, means for pivotally mounting the operating element within said opening, the inner edge of said cam engaging the inner end of the supporting arm for rocking it about its pivot upon swinging of said operating element to tilt the mirror upwardly or downwardly, and spring means carried by the body member and engaging said arm opposite said cam for maintaining it in yieldable engagement with the cam.

7. In a mounting for a rear view mirror for automobiles, a body member having means for attachment to the automobile and provided with an opening therein, a substantially horizontal supporting arm having means at its outer end for attachment to the mirror and its inner end received within said opening, means for pivotally mounting the arm intermediate its ends within said opening, an operating element having a cam portion received within said opening and a handle portion projecting outwardly thereof, means for pivotally mounting the operating element within said opening, the inner edge of said cam being provided with a plurality of grooves adapted for selective engagement with the inner end of the supporting arm for rocking it about its pivot upon swinging of said operating element to tilt the mirror upwardly or downwardly, said grooves being disposed radially at different distances from the axis about which the operating element swings to effect adjustment of the mirror to different angular positions.

8. In a mounting for a rear view mirror for automobiles, a body member having means for attachment to the automobile and provided with an opening therein, a substantially horizontal supporting arm having means at its outer end for attachment to the mirror and its inner end received within said opening, means for pivotally mounting the arm intermediate its ends within said opening, an operating element having a cam portion received within said opening and a handle portion projecting outwardly thereof, means for pivotally mounting the operating element within said opening, the inner edge of said cam being provided with a plurality of grooves adapted for selective engagement with the inner end of the supporting arm for rocking it about its pivot upon swinging of said operating element to tilt the mirror upwardly or downwardly, said grooves being disposed radially at different distances from the axis about which the operating element swings to effect adjustment of the mirror to different angular positions, and spring means carried by the body member and engaging said arm for maintaining it in yieldable engagement within said grooves.

9. In a mounting for a rear view mirror for automobiles, a body member having means for attachment to the automobile and provided with an opening therein, a substantially horizontal supporting arm having means at its outer end for attachment to the mirror and its inner end received within said opening, means for pivotally mounting the arm intermediate its ends within said opening, an operating element having a cam portion received within said opening and a handle portion projecting outwardly thereof, means for pivotally mounting the operating element within said opening, the inner edge of said cam constituting a smooth surface so shaped as to effect tilting of the mirror to a plurality of angular positions upon swinging of said operating element about its pivot.

10. In a mounting for a rear view mirror for automobiles, a body member having means for attachment to the automobile and provided with an opening therein, a substantially horizontal supporting arm having means at its outer end for attachment to the mirror and its inner end received within said opening, means for pivotally mounting the arm intermediate its ends within said opening, an operating element having a cam portion received within said opening and a handle portion projecting outwardly thereof, means for pivotally mounting the operating element within said opening, the inner edge of said cam constituting a smooth surface so shaped as to effect tilting of the mirror to a plurality of angular positions upon swinging of said operating element about its pivot, and interengaging means on the operating element and body member for locating the cam in desired adjusted position and for yieldably maintaining it in such position.

11. In a mounting for a rear view mirror for automobiles, a body member having means for attachment to the automobile and provided with an opening therein, a substantially horizontal supporting arm having means at its outer end for attachment to the mirror and its inner end received within said opening, means for pivotally mounting the arm at its inner end within said opening, an operating element having a cam received within said opening and a handle portion projecting exteriorly thereof, means for pivotally mounting the operating element to swing about an axis extending at substantially right angles to the axis on which said arm is pivotally mounted, said cam engaging said arm intermediate its ends for rocking said arm, upon swinging of said operating element, to tilt the mirror upwardly or downwardly.

12. In a mounting for a rear view mirror for automobiles, a body member having means for attachment to the automobile and provided with an opening therein, a substantially horizontal supporting arm having means at its outer end for attachment to the mirror and its inner end received within said opening, means for pivotally mounting the arm at its inner end within said opening, an operating element having a cam received within said opening and a handle portion projecting exteriorly thereof, means for pivotally mounting the operating element to swing about an axis extending at substantially right angles to the axis on which said arm is pivotally mounted, said cam engaging said arm intermediate its ends for rocking said arm, upon swinging of said operating element, to tilt the mirror upwardly or downwardly, the inner edge of said cam being provided with a plurality of grooves adapted for selective engagement with the supporting arm intermediate its ends for rocking it upon swinging of said operating element to tilt the mirror upwardly or downwardly, said grooves being disposed radially at different distances from the axis about which the operating element swings to effect adjustment of the mirror to different angular positions.

13. In a mounting for a rear view mirror for automobiles, a body member having means for attachment to the automobile and provided with an opening therein, a substantially horizontal supporting arm having means at its outer end for attachment to the mirror and its inner end received within said opening, means for pivotally mounting the arm at its inner end within said opening, an operating element having a cam received within said opening and a handle portion projecting exteriorly thereof, means for pivotally mounting the operating element to swing about an axis extending at substantially right angles to the axis on which said arm is pivotally mounted, said cam engaging said arm intermediate its ends for rocking said arm, upon swinging of said operating element, to tilt the mirror upwardly or downwardly, the inner edge of said cam being provided with a plurality of grooves adapted for selective engagement with the supporting arm intermediate its ends for rocking it upon swinging of said operating element to tilt the mirror upwardly or downwardly, said grooves being disposed radially at different distances from the axis about which the operating element swings to effect adjustment of the mirror to different angular positions, and spring means carried by said body member for yieldably maintaining said supporting arm and cam in engagement with one another.

14. In a mounting for a rear view mirror for automobiles, a body member having means for attachment to the automobile and provided with an opening therein, a substantially horizontal supporting arm having means at its outer end for attachment to the mirror and its inner end received within said opening, means for pivotally mounting the arm at its inner end within said opening, an operating element having a cam received within said opening and a handle portion projecting exteriorly thereof, means for pivotally mounting the operating element to swing about an axis extending at substantially right angles to the axis on which said arm is pivotally mounted, said cam engaging said arm intermediate its ends for rocking said arm, upon swinging of said operating element, to tilt the mirror upwardly or downwardly, the inner edge of said cam constituting a smooth surface so shaped as to effect tilting of the mirror to a plurality of angular positions upon swinging of said operating element about its pivot.

15. In a mounting for a rear view mirror for automobiles, a body member having means for attachment to the automobile and provided with an opening therein, a substantially horizontal supporting arm having means at its outer end for attachment to the mirror and its inner end received within said opening, means for pivotally mounting the arm at its inner end within said opening, an operating element having a cam received within said opening and a handle portion projecting exteriorly thereof, means for pivotally mounting the operating element to swing about an axis extending at substantially right angles to the axis on which said arm is pivotally mounted, said cam engaging said arm intermediate its ends for rocking said arm, upon swinging of said operating element, to tilt the mirror upwardly or downwardly, the inner edge of said cam constituting a smooth surface so shaped as to effect tilting of the mirror to a plurality of angular positions upon swinging of said operating element about its pivot, spring means carried by said body member for yieldably maintaining said supporting arm and cam in engagement with one another, and interengaging means on the operating element and body member for locating the cam in desired adjusted position and for yieldably maintaining it in such position.

DWIGHT W. BARKLEY.

REFERENCES CITED

The following references are of record in the file of this patent:

UNITED STATES PATENTS

| Number | Name | Date |
|---|---|---|
| 964,493 | Coder | July 19, 1910 |
| 1,602,003 | Drake | Oct. 5, 1926 |
| 1,750,450 | Woodhead | Mar. 11, 1930 |
| 2,410,171 | Le Lande | Oct. 29, 1946 |